United States Patent
Ise

(10) Patent No.: US 11,310,442 B2
(45) Date of Patent: Apr. 19, 2022

(54) DISPLAY CONTROL APPARATUS FOR DISPLAYING IMAGE WITH/WITHOUT A FRAME AND CONTROL METHOD THEREOF

(71) Applicant: CANON KABUSHIKI KAISHA, Tokyo (JP)

(72) Inventor: Toshimichi Ise, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 16/994,415

(22) Filed: Aug. 14, 2020

(65) Prior Publication Data
US 2021/0058567 A1 Feb. 25, 2021

(30) Foreign Application Priority Data
Aug. 23, 2019 (JP) .............................. JP2019-152800

(51) Int. Cl.
*H04N 5/262* (2006.01)
*G06T 3/40* (2006.01)
*G06F 3/14* (2006.01)
*H04N 5/445* (2011.01)
*H04N 5/232* (2006.01)

(52) U.S. Cl.
CPC ............. *H04N 5/2628* (2013.01); *G06F 3/14* (2013.01); *G06T 3/40* (2013.01); *H04N 5/23216* (2013.01); *H04N 5/23245* (2013.01); *H04N 5/445* (2013.01)

(58) Field of Classification Search
CPC .............. H04N 5/225; H04N 5/23248; H04N 5/23245; H04N 5/23216; H04N 5/445; H04N 5/2628; G06F 3/14; G06T 3/40
USPC .................... 348/208.1, 14.07, 563, 222.1
See application file for complete search history.

(56) References Cited

U.S. PATENT DOCUMENTS

2013/0147974 A1\* 6/2013 Ju et al. ............. H04N 5/23248
348/208.1

FOREIGN PATENT DOCUMENTS

JP 2006-140591 A 6/2006

\* cited by examiner

*Primary Examiner* — Xi Wang
(74) *Attorney, Agent, or Firm* — Canon U.S.A., Inc. IP Division

(57) ABSTRACT

A display control apparatus displays an image on a display unit in such a manner that, in a second shooting, the image to be displayed on the display unit is reduced to a smaller size in a case where a frame display setting is ON than in a case where the frame display setting is OFF, and, in a first shooting, the image to be displayed on the display unit in the case where the frame display setting is ON is not reduced to a size smaller than that of the image to be displayed on the display unit in the case where the frame display setting is OFF, the frame display setting being a display setting for information.

14 Claims, 9 Drawing Sheets

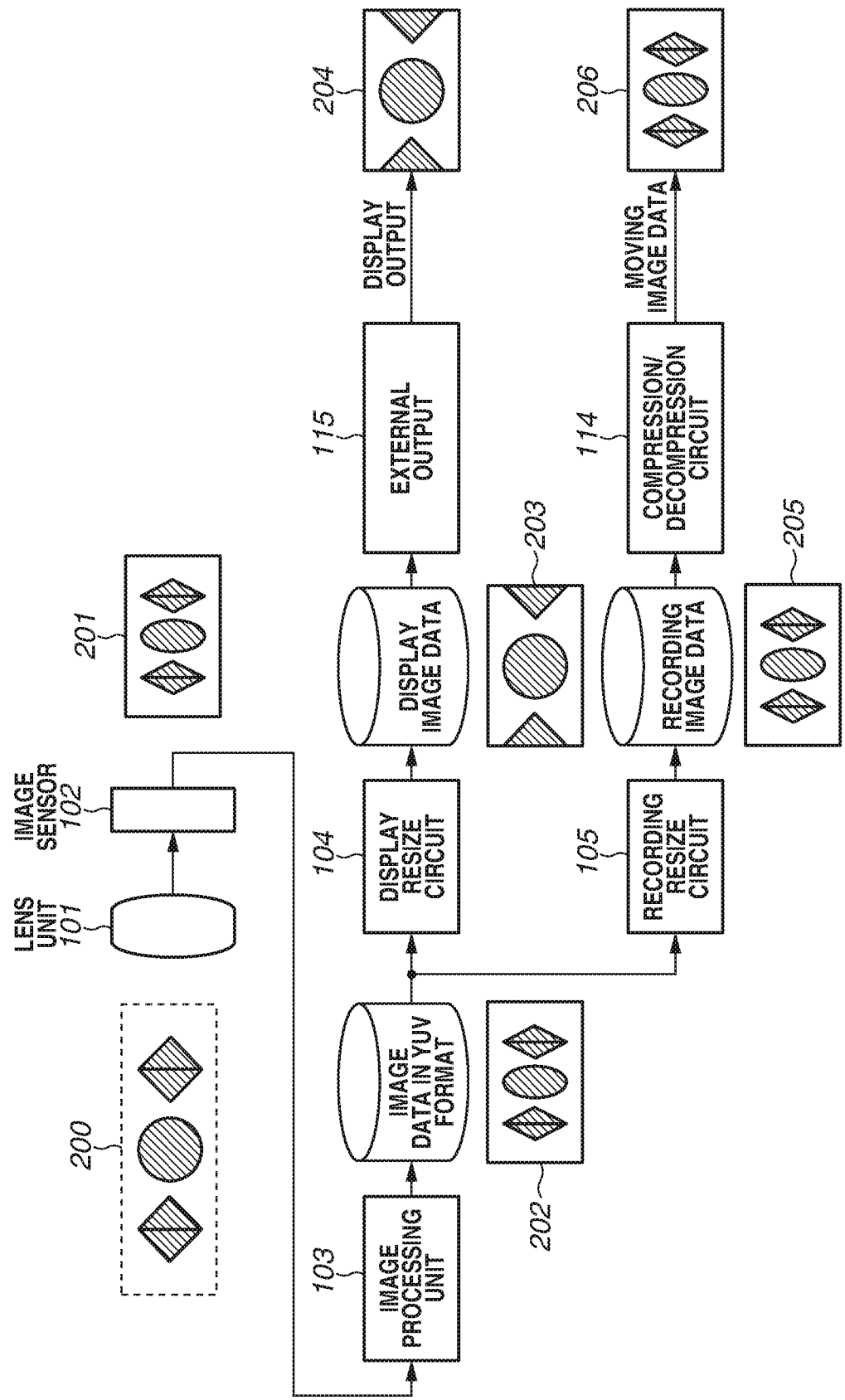

FIG.7A
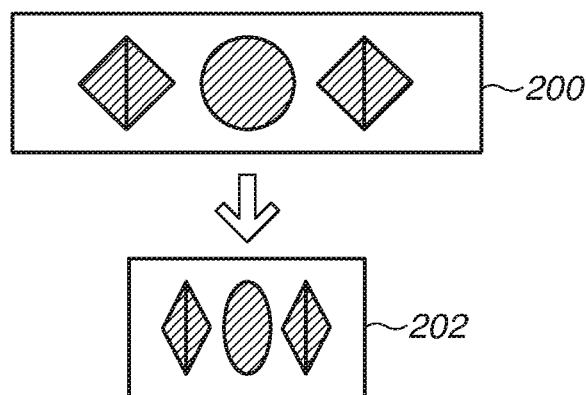
FIG.7B  FIG.7C  FIG.7D
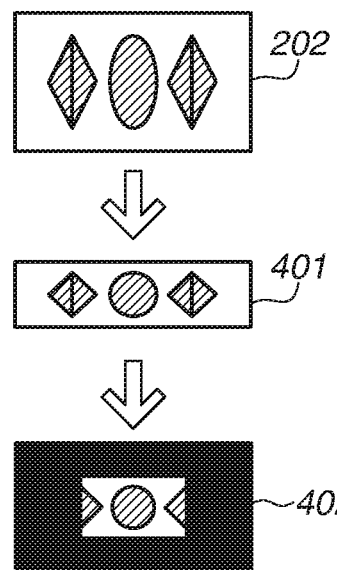 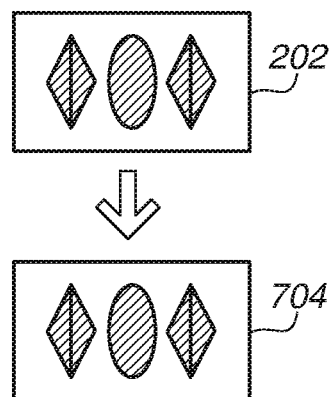 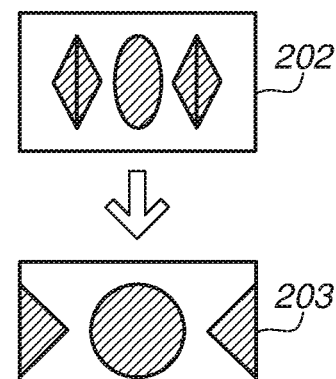

WHEN "Magn" WITH DESQUEEZE DISPLAY ON SETTING ARE EXECUTED

WHEN DISPLAY IMAGE DATA IS REDUCED IN VERTICAL DIRECTION (WITHOUT LEFT AND RIGHT MASKS)

DISPLAY CONTROL APPARATUS FOR DISPLAYING IMAGE WITH/WITHOUT A FRAME AND CONTROL METHOD THEREOF

BACKGROUND

Technical Field

One disclosed aspect of the embodiments relates to a technique for displaying an image and information.

Description of the Related Art

Japanese Patent Laid-Open No. 2006-140591 discusses a technique in which a blank area generated within a frame is used as a character string input area by enlarging or reducing an image. It is known that a laterally compressed image can be acquired in shooting with an anamorphic lens.

As discussed in Japanese Patent Laid-Open No. 2006-140591, in a case where a blank area for displaying information, such as a character string, is provided by an image size reduction or enlargement, if the blank area is present around an already displayed image, the image is further reduced. When this occurs, the image visibility is deteriorated or degraded when information is displayed at the periphery of an image.

SUMMARY

The present disclosure has been made in consideration of the aforementioned problems, and realizes a display control technique capable of preventing deterioration in image visibility when information is displayed at the periphery of an image.

A display control apparatus includes an acquisition unit, a switching unit, and a control unit. The acquisition unit is configured to acquire a captured image. The switching unit is configured to switch between first shooting and second shooting different from the first shooting. The first shooting is shooting in which at least one of a condition that a recording resolution is greater than or equal to a predetermined resolution and a condition that a shooting frame rate is greater than or equal to a predetermined frame rate is satisfied. The control unit is configured to perform control to display an image on a display unit in such a manner that the image to be displayed on the display unit is modified according to the first shooting or second shooting. In the second shooting, the image is reduced to a smaller size in a case where a frame display setting is ON than in a case where the frame display setting is OFF. In the first shooting, the image in the case where the frame display setting is ON is not reduced to a size smaller than that of the image to be displayed on the display unit in the case where the frame display setting is OFF. The frame display setting is a display setting for information.

The present disclosure provides a method for controlling a display control apparatus including acquiring a captured image, switching between first shooting and second shooting different from the first shooting, and performing control. The first shooting is shooting in which at least one of a condition that a recording resolution is greater than or equal to a predetermined resolution and a condition that a shooting frame rate is greater than or equal to a predetermined frame rate is satisfied Performing control is to control to display an image on a display unit in such a manner that the image to be displayed on the display unit is modified according to the first shooting or second shooting. In the second shooting, the image is reduced to a smaller size in a case where a frame display setting is ON than in a case where the frame display setting is OFF. In the first shooting, the image in the case where the frame display setting is ON is not reduced to a size smaller than that of the image in the case where the frame display setting is OFF. The frame display setting being a display setting for information.

The present disclosure provides a non-transitory computer-readable storage medium storing a program for causing a computer to function as an acquisition unit, a switching unit and a control unit of a display control apparatus. The acquisition unit is configured to acquire a captured image. The switching unit is configured to switch between first shooting and second shooting different from the first shooting. The first shooting is shooting in which at least one of a condition that a recording resolution is greater than or equal to a predetermined resolution and a condition that a shooting frame rate is greater than or equal to a predetermined frame rate is satisfied. The control unit is configured to perform control to display an image on a display unit in such a manner that the image to be displayed on the display unit is modified according to the first shooting or second shooting. In the second shooting, the image is reduced to a smaller size in a case where a frame display setting is ON than in a case where the frame display setting is OFF. In the first shooting, the image in the case where the frame display setting is ON is not reduced to a size smaller than that of the image to be displayed on the display unit in the case where the frame display setting is OFF. The frame display setting is a display setting for information.

Further features of the present disclosure will become apparent from the following description of exemplary embodiments with reference to the attached drawings.

BRIEF DESCRIPTION OF THE DRAWINGS

FIG. 2 illustrates a flow of image data in first desqueeze processing according to the present embodiment.

FIGS. 7A to 7D are explanatory diagrams each illustrating a display example according to the present embodiment.

DESCRIPTION OF THE EMBODIMENTS

Exemplary embodiments of the present disclosure will be described below with reference to the accompanying drawings.

Figure 1A:
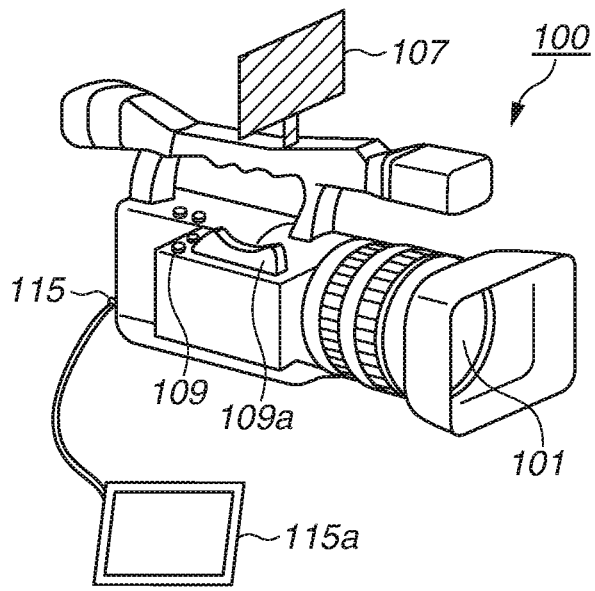
FIGS. 1A and 1B each illustrate a configuration of a video camera according to an embodiment.

FIG. 1A is a view illustrating an external configuration of a video camera 100 which is an example of a display control apparatus according to the present embodiment.

The video camera 100 includes a lens unit 101 on a front surface of the video camera 100, a user operation unit 109 (hereinafter referred to as the operation unit 109) on a side surface of the video camera 100, and a panel 107 on an upper surface of the video camera 100. The panel 107 is removable from (attachable to and detachable from) a main body of the video camera 100. An external output 115 is a terminal for connecting a display unit which is not removable from the video camera 100. The external output 115 is, for example, a high-definition multimedia interface (HDMI, trade mark) terminal or a serial digital interface (SDI) terminal. The operation unit 109 is an operation member including a rocker-switch type grip zoom 109a (zoom key), various switches and buttons that receive various operations from a user. Examples of the operation unit 109 include a power supply switch for switching ON and OFF of a power supply, a menu button for displaying a menu screen, and a mode selection switch capable of switching an operation mode. The mode selection switch switches the operation mode of the video camera 100 to any one of a still image recording mode, a moving image shooting mode, a playback mode, and the like.

Figure 1B:
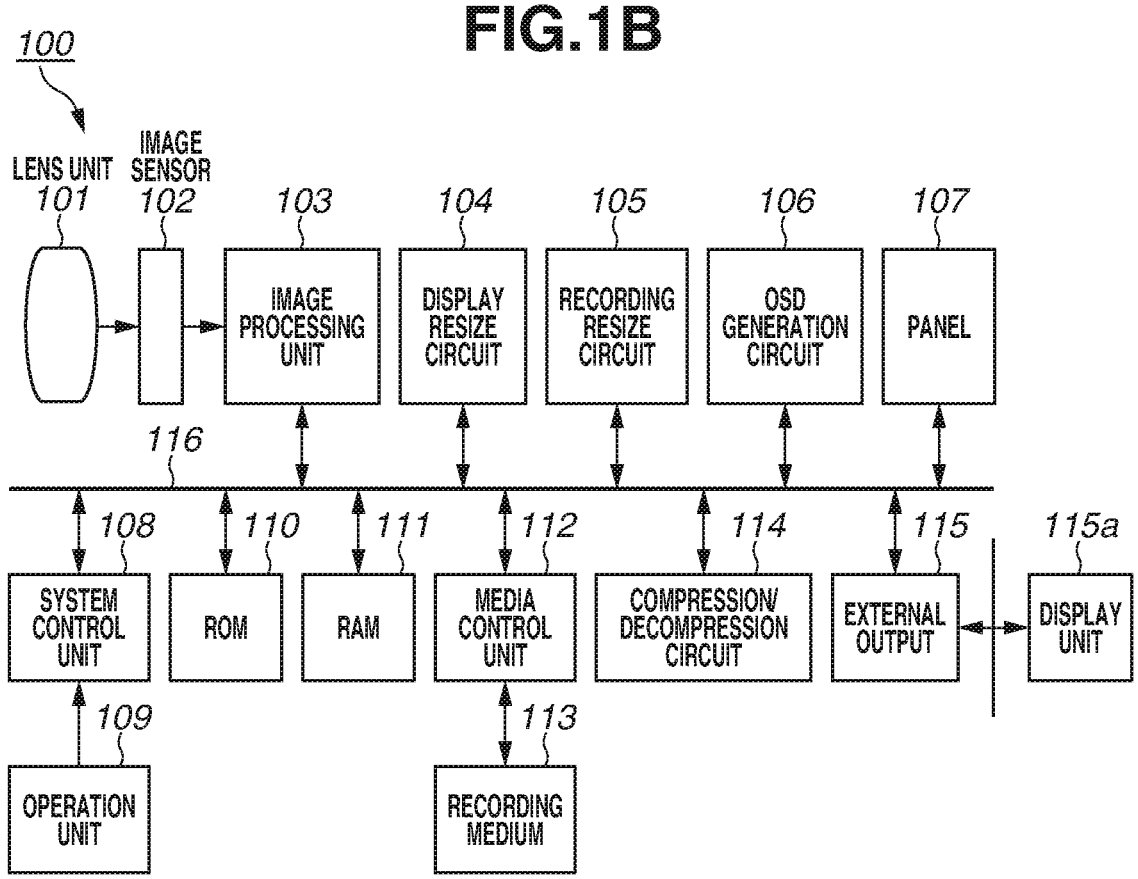

FIG. 1B is a block diagram illustrating the video camera 100 according to the present embodiment. The lens unit 101 is includes a fixed lens group for condensing light, a magnification lens group, a diaphragm, and a correction lens group including the function of correcting an image forming position that has been moved with a movement of the magnification lens group and the function of performing focus adjustment. The lens unit 101 finally forms an object image on an imaging plane of an image sensor 102, which is described below. The lens unit 101 includes an interchangeable lens that is attachable to a lens attachment portion. The lens unit 101 does not necessarily include the above-described lens groups depending on the interchangeable lens to be attached. An anamorphic lens (with a compression ratio of 2) for optically reducing (or squeezing) the size of the object image to be formed on the image sensor 102 to a half of its original size laterally (in the horizontal direction) can be attached to the lens attachment portion. In addition, for example, an anamorphic lens (with a compression ratio of 1.3) for optically reducing (or squeezing) the size of the object image to 1/1.3 of its original size laterally (in the horizontal direction) can also be attached to the lens attachment portion. In other words, the object image is formed in a state where the object image is optically compressed in the horizontal direction with respect to the vertical direction.

In a case where a completely round object is shot using an anamorphic lens, the object image is optically squeezed and laterally compressed. Thus, the object image is formed on the image sensor 102 as a vertically-long elliptic object, and then the image is captured. If the image is displayed without change, the image is displayed as a vertically-long elliptic object. However, the performing of desqueeze processing on the image restores the image into the completely round shape and the image of the completely round object is displayed. The present embodiment illustrates an example of desqueeze display in a case where an anamorphic lens having a compression ratio of 2 is attached. If an anamorphic lens having another magnification is attached, a clipping range and a magnification for desqueeze may be changed. In image data acquired using the anamorphic lens, a distortion produced by the anamorphic lens in the vicinity of the center of the image is greatly different from those at left and right ends of the image. Accordingly, if the image is simply stretched horizontally, a distortion may occur. Thus, a central area with less distortion is clipped, or a black band is displayed in left and right end areas (band display), thus enabling display of an image that can be easily viewed from the user.

The image sensor 102 converts light into electric charges and generates an image capture signal. The generated image capture signal is output to an image processing unit 103. The image sensor 102 is an image sensor, such as a charge-coupled device (CCD) image sensor and a complementary metal-oxide semiconductor (CMOS) image sensor. For the image sensor 102, a dual-pixel-type image sensor may also be used in which all pixels on an image capturing plane are each composed of a pair of light-receiving elements, and a pair of optical images formed by a micro lens in each of the pixels can be photoelectrically converted by the pair of light-receiving elements.

The image processing unit 103 converts the image capture signal, which is received and acquired from the image sensor 102, into RAW data (RAW image). After that, RAW development processing, such as interpolation processing and image quality adjustment processing, is performed on the RAW data, generates YUV format image data corresponding to the RAW data, and the generated image data is stored in a random access memory (RAM) 111.

A display resize circuit 104 performs resize processing or desqueeze processing (described below) on the YUV format image data stored in the RAM 111, generates display image data, and stores the generated display image data in the RAM 111.

A recording resize circuit 105 performs resize processing on the YUV format image data stored in the RAM 111, generates recording image data, and stores the generated recording image data in the RAM 111.

A bus 116 is a data bus through which the blocks of the video camera 100 exchange data. The blocks of the video camera 100 exchange data through the bus 116.

An on-screen display (OSD) generation circuit 106 stores OSD data, such as various setting menus, a title, and time, in the RAM 111. The stored OSD data is combined with display image data stored in the RAM 111, and the combined data is displayed on the panel 107, which serves as the display unit, or is output to the outside of the video camera 100 through the external output 115.

The panel 107 is a display panel, such as a liquid crystal panel or an organic electroluminescent (EL) panel, and is used to display the display image data and the OSD data.

A system control unit 108 controls the overall operation of the video camera 100. The system control unit 108 may include a processor or a programmable device that executes a set of instructions or program to perform operations described in the following.

The operation unit 109 is used for the user to input an operation. The operation unit 109 is also provided with a switch for selecting a camera mode mainly used for camera shooting, a playback mode mainly used for playback, and a power-off mode for turning off the power supply. The grip zoom 109a is a zoom key with which the display magnification of a captured image can be changed.

Figure 6:
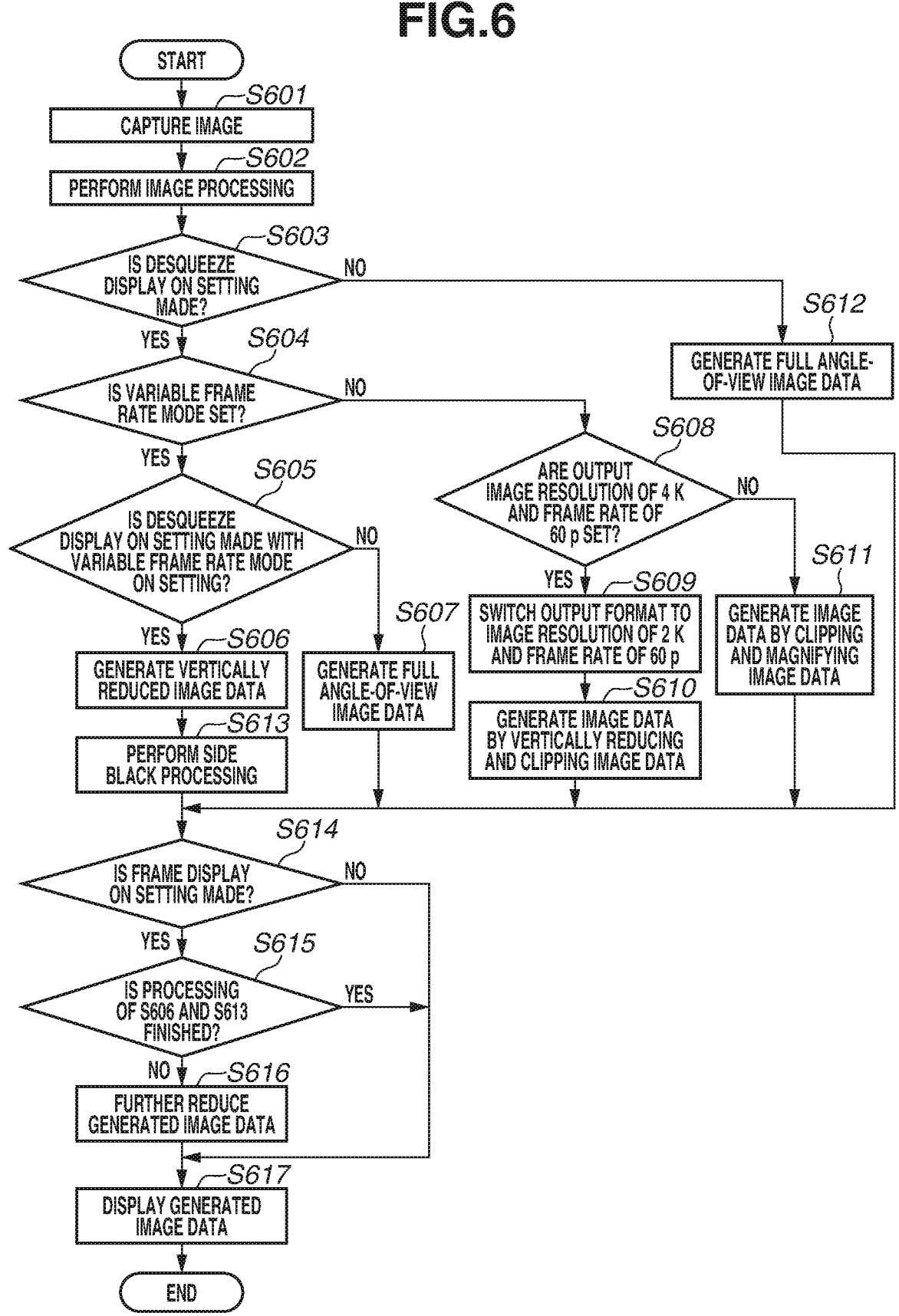
FIG. 6 is a flowchart illustrating display processing according to the present embodiment.

A read-only memory (ROM) 110 is a nonvolatile recording medium that stores programs and the like to be executed by the system control unit 108 to perform operations described in the following such as FIG. 6, and is composed of, for example, a flash ROM. Alternatively, program data stored in a recording medium 113 may be loaded into the RAM 111, and the RAM 111 may be used as a ROM. A part of the area of the ROM 110 is used as a backup area for holding a system state and the like.

The RAM 111 is a volatile memory used as a work area for the system control unit 108. The RAM 111 is a volatile memory used as a work area for the system control unit 108, the image processing unit 103, and a compression/decompression circuit 114.

A media control unit 112 is used to record moving image data, which is generated by the compression/decompression circuit 114 and is output to the RAM 111, on the recording medium 113 in accordance with a format compatible with a computer of a file allocation table (FAT) file system or the like. The recording medium 113 is removable from the video camera 100, and can be attached not only to the video camera 100, but also to a personal computer (PC) or the like.

The compression/decompression circuit 114 performs Moving Picture Experts Group (MPEG) compression (encoding) on the image data stored in the RAM 111, generates moving image data, and outputs the generated moving image data to the RAM 111.

The external output 115 is an external output unit, such as an HDMI/SDI terminal, and outputs the display image data, which is output to the RAM 111 from the image processing unit 103, to an external display unit 115a or the like. The display image data can be output using a signal, such as a 4K60p signal and a 2K60p signal.

Next, first desqueeze processing according to the present embodiment will be described with reference to FIGS. 2 and 3.

FIG. 2 illustrates a flow of image data in a process from shooting by the video camera 100 to display or recording. Assume that the lens unit 101 is an anamorphic lens having a horizontal and vertical compression ratio of 1:2.

An object 200 is an object to be captured by the video camera 100. The captured image of the object 200 is formed as an image 201 in the image sensor 102 in a state where the image is compressed at an aspect ratio of 1:2 by the lens unit 101. The formed optical image is photoelectrically converted into an image capture signal, and the image capture signal is input to the image processing unit 103. The input image capture signal is then stored as YUV format image data 202 in the RAM 111. The display resize circuit 104 performs the first desqueeze processing (described below) on the YUV format image data 202 stored in the RAM 111 to generate display image data 203, and the generated display image data 203 is stored in the RAM 111. The stored display image data 203 is output to the outside of the video camera 100 by HDMI or the like through the external output 115, and an image 204 is displayed.

The YUV format image data 202 is input to the compression/decompression circuit 114 as recording image data 205 that has been resized into a recording size by the recording resize circuit 105. The image data is then compressed into moving image data 206 by the compression/decompression circuit 114, and is recorded on the recording medium 113 through the media control unit 112.

Figure 3:
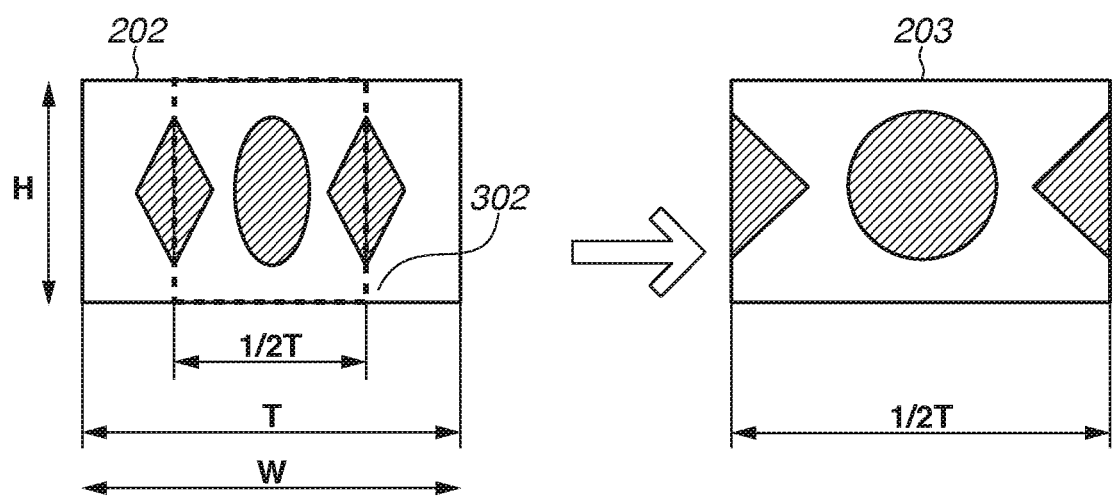
FIG. 3 is an explanatory diagram illustrating display control in the first desqueeze processing according to the present embodiment.

FIG. 3 is an explanatory diagram illustrating the first desqueeze processing performed by the display resize circuit 104.

The left diagram of FIG. 3 illustrates an example of the YUV format image data 202 (acquired by the display resize circuit 104) to be input to the display resize circuit 104.

In the following description, the width of the YUV format image data 202 is represented by W and the height of the YUV format image data 202 is represented by H. The display resize circuit 104 clips a clipping range 302 which ranges from ¼ W to ¾ W from the left side of the YUV format image data 202 and has the height H. Magnification processing is then performed with magnifications different between a longitudinal direction and a lateral direction. The magnification processing is performed such that the magnification in the lateral direction (magnification for width) is twice as large as the magnification in the longitudinal direction (magnification for height). Thus, the displayed image appears to be laterally stretched to twice the width of the original image 201 compared with the case where the original image 201 is displayed without change. Thus, in the lens unit 101, the object image which is laterally compressed compared with the appearance of the actual object is laterally stretched to twice the width of the compressed object image, which brings the object image closer to the appearance of the original object. The desqueeze processing in which the magnification in the lateral direction is twice as large as the magnification in the longitudinal direction as described above is referred to as the first desqueeze processing (first resize processing). The image data generated through the first desqueeze processing is one represented by the display image data 203 illustrated on the right diagram of FIG. 3. In the first desqueeze processing, the display image data 203 is generated using ½ of the width of the input image in the YUV format image data 202 input to the display resize circuit 104. This is because the compression magnification in the lateral direction in the lens unit 101 according to the present embodiment is two. If a magnification other than two is used, the size of the clipping range 302 is not limited to this example. The YUV format image data 202 is scanned in the horizontal direction and is input to the display resize circuit 104 line by line. When an input time for inputting one line of the YUV format image data 202 to the display resize circuit 104 is represented by T, the input time for the clipping range 302 is represented by ½ T. Accordingly, the time for writing one line of the display image data 203 is to be set to ½ T or less.

If the time for generating display image data is longer than the input time, the time from the timing of image-capturing to the display of an image can be increased, or the image of each frame of the captured image cannot be displayed. In another case, the image needs to be output in a state where the display image data is cut short. For this reason, there is a need to generate one line of the display image data 203 within the time of ½ T. The display resize circuit 104 has limitations in performance, and thus, if the time available for processing of generating display image (i.e., time of ½ T) is reduced, the generation of the display image data 203 cannot be completed in time.

The input time T is dependent on the frame rate of the video camera 100 (T is 1/60 s when the frame rate is 60 fps, and T is 1/120 s when the frame rate is 120 fps). In other words, as the frame rate increases, the time available for resize processing is shortened, so that the display processing cannot be completed in time.

Figure 4:
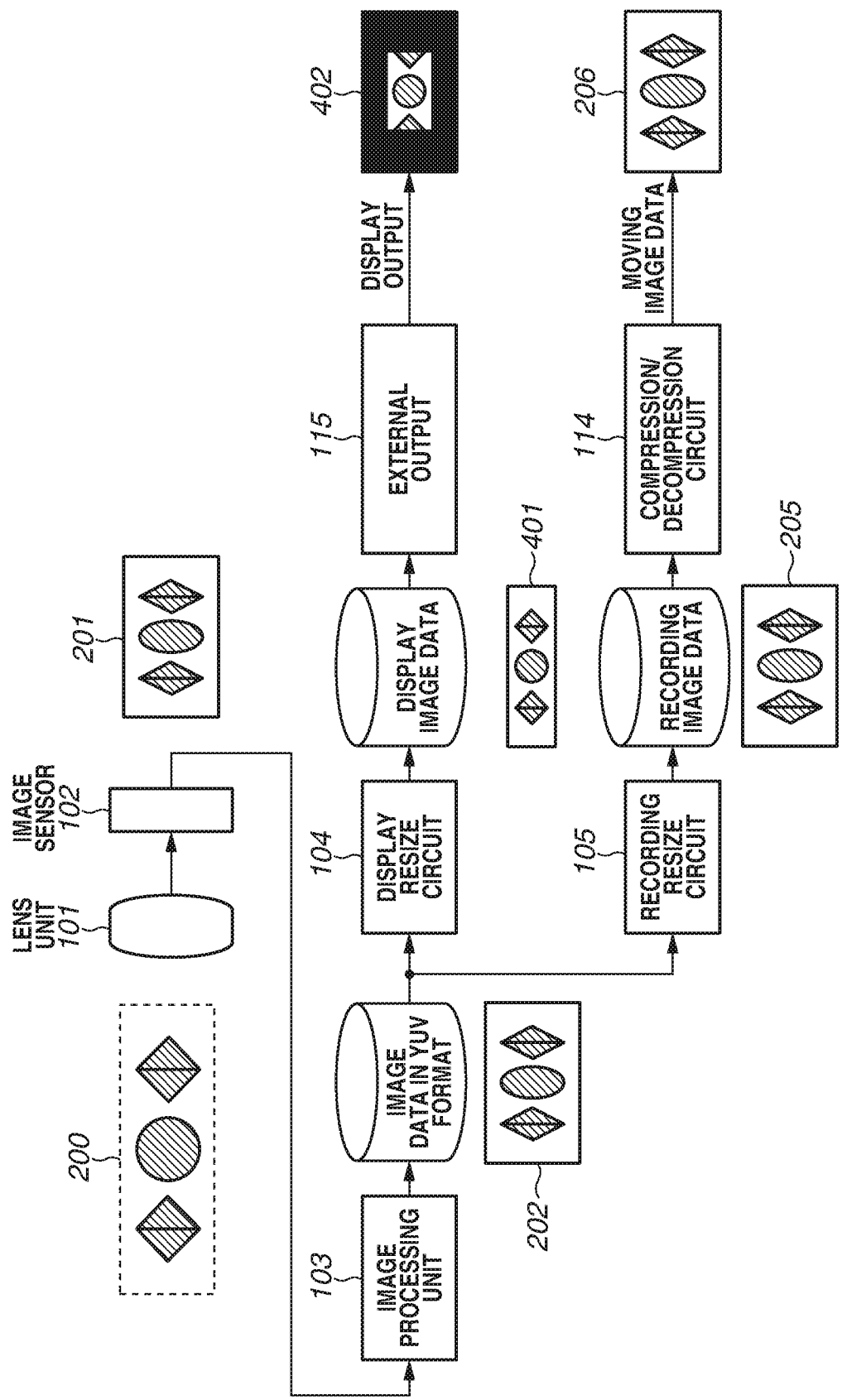
FIG. 4 illustrates a flow of image data in second desqueeze processing according to the present embodiment.

Next, second desqueeze processing will be described with reference to FIG. 4. The process for image data until the image data is input to the display resize circuit 104 is similar to that illustrated in FIG. 2, and thus the description thereof is omitted.

The display resize circuit 104 performs the second desqueeze processing (second resize processing) to be described below on the YUV format image data 202 stored in the RAM 111 to generate display image data 401, and the generated display image data 401 is stored in the RAM 111. The stored display image data 401 is output to the outside of the video camera 100 by HDMI or the like through the external output 115 in a state where black bands are added to upper and lower areas, and then an image 402 is displayed.

As in the case of FIG. 2, the YUV format image data 202 is input to the compression/decompression circuit 114 as the recording image data 205 that has been resized into a recording size by the recording resize circuit 105. After that, the recording image data 205 is compressed by the compression/decompression circuit 114 to generate moving image data 206, and the generated moving image data 206 is recorded on the recording medium 113 through the media control unit 112.

Figure 5:
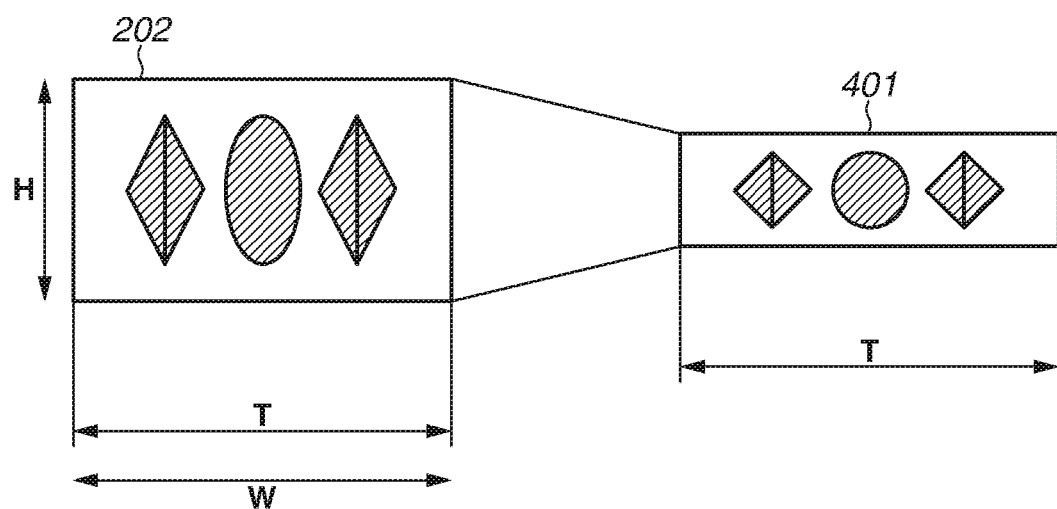
FIG. 5 is an explanatory diagram illustrating display control in the second desqueeze processing according to the present embodiment.

Next, the second desqueeze processing will be described with reference to FIG. 5. FIG. 5 is an explanatory diagram illustrating the second desqueeze processing performed by the display resize circuit 104.

The left diagram of FIG. 5 illustrates an example of the YUV format image data 202 to be input to the display resize circuit 104. As in the case of FIG. 3, the width of the YUV format image data 202 is represented by W and the height of the YUV format image data 202 is represented by H. The display resize circuit 104 performs desqueeze processing with respect to the range of the width W and the height H of the YUV format image data 202. Here, magnification processing is performed with magnifications different between the longitudinal direction (vertical direction) and the lateral direction (horizontal direction). Unlike in the first desqueeze processing described above with reference to FIGS. 3 and 4, in the second desqueeze processing, the magnification in the longitudinal direction is set to half the magnification in the lateral direction. Through the magnification processing in which the magnification in the longitudinal direction (magnification for height) is set to half the magnification in the lateral direction (magnification for width), the image to be displayed appears compressed in the longitudinal direction compared with a case where the original image 201 is displayed without change. Thus, in the lens unit 101, the object image which is laterally compressed compared with the appearance of the actual object is compressed in the longitudinal direction to half its size, which brings the object image closer to the appearance of the original object. The second desqueeze processing refers to the method for thus bringing the laterally compressed object image closer to the appearance of the original object through longitudinal compression without clipping a portion of the input image in the lateral direction (without clipping a portion of the YUV format image data in the lateral direction). The image data to be generated here is one represented by the display image data 401 illustrated on the right diagram of FIG. 5. The clipping in the lateral direction is not performed on the YUV format image data 202 and the display image data 401, and thus the time for writing one line of the display image data 401 can be provided using the input time T for inputting one line to the display resize circuit 104. For example, in a case where the first desqueeze processing is performed when a line of 1920 pix is input with the input time T, display data corresponding to 1920 pix is to be written with the time of ½ T because a half of the image is clipped. In the second desqueeze processing, when one line of 1920 pix is input with the input time T, display data can be written with the input time T.

However, since the image to be displayed after the second desqueeze processing is performed is smaller than the image obtained through the first desqueeze processing, the first desqueeze processing provides a higher visibility than that provided by the second desqueeze processing for a user who desires to display an image with a large size.

The display image data 401 is not directly displayed, but instead, as described above with reference to FIG. 4, the image 402 in the state where black bands are added to the upper and lower areas (side black processing) with respect to the display image data 401 is displayed.

Next, display processing according to the present disclosure will be described with reference to FIG. 6. Each process in a flowchart illustrated in FIG. 6 is implemented such that the system control unit 108 constituting the video camera 100 executes a program stored in the RAM 111. In step S601, the system control unit 108 controls the image sensor 102 to capture the image by photoelectrically converting the object image 200, which has been formed on the image sensor 102 and has passed through the lens unit 101, into an image capture signal, and to output the image capture signal to the image processing unit 103. In such a case, the object image 201 obtained through the lens unit 101 is laterally compressed compared with the appearance of the actual object.

In step S602, the system control unit 108 controls the image processing unit 103 to perform image processing. This includes to convert the image capture signal into RAW data (RAW image). After that, the system control unit 108 performs RAW development processing, such as interpolation processing and image quality adjustment processing, on the RAW data to generate the YUV format image data 202 corresponding to the RAW data, and stores the generated YUV format image data 202 in the RAM 111. FIG. 7A illustrates the object 200 which is shot by the video camera 100 and the YUV format image data 202. The object 200 is converted into image data that has been laterally compressed through the lens unit 101.

In step S603, the system control unit 108 determines whether a desqueeze display ON setting is made as a setting for the video camera 100. The desqueeze display ON setting refers to a setting for enabling (ON) or disenabling (OFF) of desqueeze processing (first desqueeze processing or second desqueeze processing) (ON). This setting can be made by the user operating the operation unit 109 based on menu information displayed on the panel 107. If the system control unit 108 determines that the desqueeze display ON setting is made (YES in step S603), the processing proceeds to step S604. If the system control unit 108 determines that a desqueeze display OFF setting is made (NO in step S603), the processing proceeds to step S612.

In step S604, the system control unit 108 determines whether a variable frame rate mode is set to a shooting setting mode for the video camera 100. The variable frame rate mode refers to a shooting mode in which the frame rate for the shooting of the video camera 100 can be changed by the user using the operation unit 109. For example, if the user sets 120 fps, the video camera 100 shots a moving image with a frame rate of 120 fps, and if the user sets 30 fps, the video camera 100 shots a moving image with a frame rate of 30 fps. In the variable frame rate mode, a playback speed in the playback mode can also be changed. Thus, in the variable frame rate mode, a video image with a motion can be recorded slowly, or variations with a lapse of time, such as those in nature observation, can be intermittently recorded (fast recording) (slow and fast motion). If the system control unit 108 determines that the variable frame rate mode is set (YES in step S604), the processing proceeds to step S605. If the system control unit 108 determines that the variable frame rate mode is not set (NO in step S604), the processing proceeds to step S608. In the variable frame rate mode, if the frame rate is set to a larger value, i.e., if the frame rate is higher than a certain frame rate, there is a possibility that the above-described first desqueeze processing cannot be completed in time.

In step S605, the system control unit 108 determines whether the desqueeze display ON setting is made with the variable frame rate mode ON setting in the video camera 100. The desqueeze display ON setting with the variable frame rate mode ON setting can be made by the user operating the operation unit 109 based on menu information displayed on the panel 107. If the system control unit 108 determines that the desqueeze display ON setting is made with the variable frame rate mode ON setting (YES in step S605), the processing proceeds to step S606. If the system control unit 108 determines that the desqueeze display ON setting is not made with the variable frame rate mode ON setting (NO in step S605), the processing proceeds to step S607. In step S605, the system control unit 108 determines whether the variable frame rate mode is set in the recording setting. However, the condition for the determination is not limited thereto. The determination may be made "YES" in a case where a predetermined condition is satisfied. Examples of the predetermined condition include the condition that a recording frame rate of a moving image is greater than or equal to a predetermined frame rate and the condition that the resolution of a moving image is greater than or equal to a predetermined resolution.

In steps S606 and S613, display processing illustrated in FIG. 7B is performed.

In step S606, the system control unit 108 performs the second desqueeze processing to generate the display image data 401. This may include generating vertically reduced image data.

In step S613, the system control unit 108 controls the display resize circuit 104 to perform side black processing on the display image data 401, which is generated in step S606, to generate the image 402, and displays the generated image 402. This side black processing refers to processing for matching the angle of view of the display image data 401 with the angle of view in the display image data 203 having been subjected to the first desqueeze processing. If the user makes a setting for displaying an image at an aspect ratio for CinemaScope, the clipping is performed so that the aspect ratio for CinemaScope is obtained through the first desqueeze processing, and the resultant image is displayed. More specifically, as a result of resizing processing, the clipping is performed so that the aspect ratio for CinemaScope is obtained. By contrast, in the second desqueeze processing, the display image data 401 includes an area outside the display range to be displayed through the first desqueeze processing. The aspect ratio of the display image data 401 is also different from that of the display image data 203 obtained through the first desqueeze processing. Thus, in step S613, display processing for adding side black bands to the left and right sides of the display image data 401 is performed so as to display an image with the aspect ratio set by the user via the display unit 115a, i.e., with the aspect ratio for CinemaScope. In step S613, a reduction desqueeze flag, which indicates that image data is vertically reduced and subjected to side black processing, is turned on. In the variable frame rate mode, in a case where the frame rate is low, the display processing can be completed in time even after the first desqueeze processing is performed. Accordingly, in a case where the frame rate is greater than a certain threshold, the second desqueeze processing may be performed, and in a case where the frame rate is less than the certain threshold, the first desqueeze processing may be performed. In such a case, however, if the display obtained through the first desqueeze processing and the display obtained through the second desqueeze processing are switched by the user changing the frame rate mode in the same shooting mode, the image visibility varies in the same mode. Thus, in the variable frame rate mode, if desqueeze display ON setting is made, the second desqueeze processing is performed regardless of the frame rate setting. This enables a stable display in which the size of an image to be displayed for confirmation by the user is not frequently changed. While the present embodiment described above illustrates an example using the aspect ratio for CinemaScope, the aspect ratio is not limited to this example. Needless to say, other aspect ratios, such as 4:3 and 16:9, can also be used.

In step S607, the system control unit 108 controls the display resize circuit 104 to generate display image data from the YUV format image data 202 for full angle of view. In the resize processing performed in this case, display image data 704 is generated with the aspect ratio not being converted, as illustrated in FIG. 7C.

For processing from step S608 to step S610, a description will be provided of display processing in a case where the variable frame rate mode is not set but a high image resolution is set.

In step S608, the system control unit 108 determines whether the output from the external output 115 has an image resolution of 4 K and a display frame rate of 60 p (fps). If the system control unit 108 determines that the image resolution is 4 K and the display frame rate is 60 p (YES in step S608), the processing proceeds to step S609. If the system control unit 108 determines that the image resolution is not 4 K and/or the display frame rate is not 60 p (NO in step S608), the processing proceeds to step S611. The setting for the output from the external output 115 may be made by the user, or may be made depending on the display ability of the display unit 115a in a preplanned manner. The image resolution and frame rate that serves as the criterion of the determination in step S608 depends on performance of the video camera 100. The image resolution and frame rate are not limited to 4 K and 60 p, which are described in the present embodiment, but instead may be 8 K or 16 K and 120 p. The image resolution and frame rate for down-convert processing to be described below are also not limited to 2 K and 60 p.

In step S609, the system control unit 108 controls the external output 115 to switch the setting for the output from the external output 115 to an image resolution of 2 K and a display frame rate of 60 fps.

In step S610, the system control unit 108 controls the display resize circuit 104 to reduce the YUV format image data 202 in the longitudinal direction, and then clips a central portion of the YUV format image data 202 to generate display image data. The generation of display image data in step S601 will now be described with reference to FIGS. 8A to 8C.

Figure 8A:
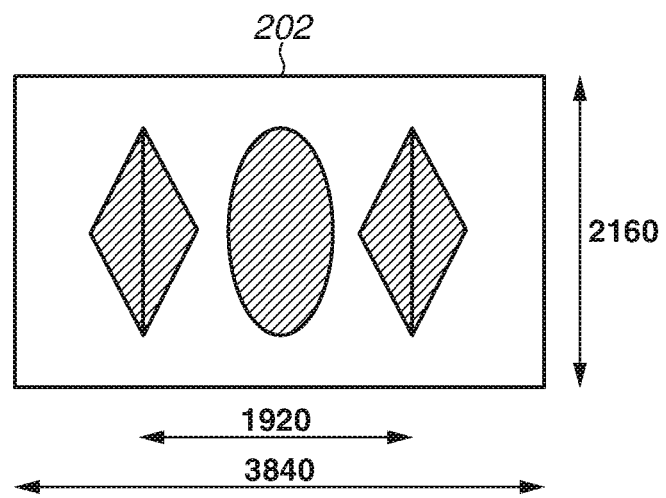
FIGS. 8A to 8C are diagrams related to display with an image resolution of 4 K and a frame rate of 60 fps in the present embodiment.
Figure 8B:
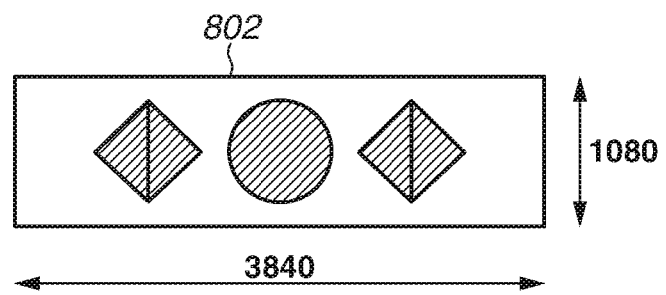
Figure 8C:
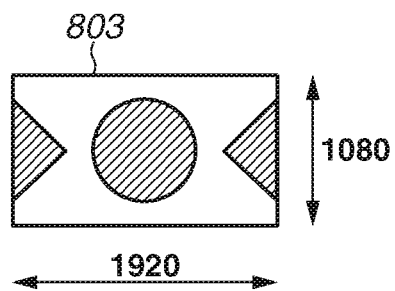

FIG. 8A illustrates the YUV format image data 202 which is input to the display resize circuit 104. The display resize circuit 104 is used to compress the YUV format image data 202 into a ½ size in the longitudinal direction. FIG. 8B illustrates display image data 802 obtained as a result of compressing the YUV format image data 202 in the longitudinal direction. Assuming that the YUV format image data 202 has a width of 3840 and a height of 2160, the display image data 802 has a width of 3840 and a height of 1080 as illustrated in FIG. 8B. Further, as illustrated in FIG. 8C, display image data 803 is generated by a central portion of the display image data 802 being clipped. The display image data 803 has a width of 1920 and a height of 1080. In other words, the image data having an image resolution of 4 K illustrated in FIG. 8A is down-converted into 2 K.

In step S611, the system control unit 108 performs the first desqueeze processing. This may be performed by generating image data by clipping and magnification. More specifically, in a case where the user sets desqueeze display setting to ON with the variable frame rate mode ON setting, the second desqueeze processing is performed. If not, the first desqueeze processing is performed. FIG. 7D illustrates the display image data 203 generated in step S611.

In step S612, the system control unit 108 controls the display resize circuit 104 to generate full angle-of-view display image data from the YUV format image data 202, as in step S607.

Figure 9A:
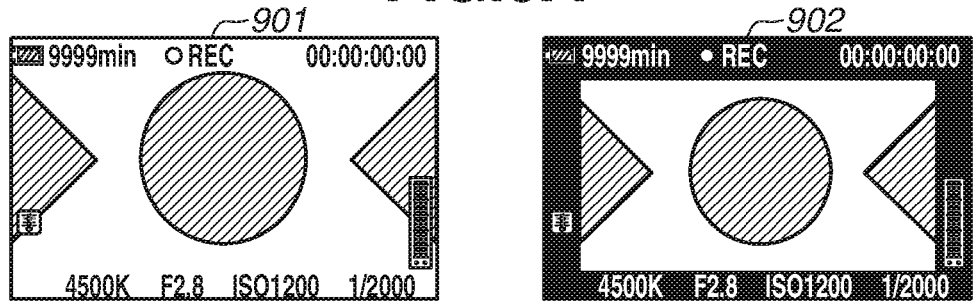
FIGS. 9A to 9D each illustrate a frame display according to the present embodiment.

In step S614, the system control unit 108 determines whether the frame display ON setting is made in the video camera 100. A frame display (surround display) will be described with reference to FIGS. 9A to 9D. The term "frame display" refers to a setting for displaying information in such a manner that the displayed information is easy to see. The information to be displayed includes a recording time for shooting, a remaining amount of power, and an International Organization for Standardization (ISO) sensitivity which are displayed along the four sides of the display unit 115a (or the panel 107), i.e., a peripheral portion of a captured image. FIGS. 9A to 9D each illustrate a display example of the frame display. In FIG. 9A, an image 901 illustrates a case where a frame display OFF setting is made, and an image 902 illustrates a case where a frame display ON setting is made. In the image 902, the size of the display image is set to smaller than the size of the image 901 to provide a band-like area along the periphery of the image (along the four sides of the display unit 115a), and displays information in the band-like area, thus preventing the image and the information from being displayed in an overlapping manner. In the image 902, the black band area is provided and white characters are displayed in the black band area. However, the frame display mode is not limited to this example. For example, black characters may be displayed on a white background, or black characters may be displayed on a gray background.

The image 901 is obtained by display image data and OSD data stored in the RAM 111 being combined, and is output to the external output 115, thus displaying the image 901 on the display unit 115a. In the image 902, display image data reduced for frame display and OSD data stored in the RAM 111 are combined with the OSD data arranged around the display image data. A frame display ON/OFF setting can be changed by the user operating a menu. If the frame display ON setting is made (YES in step S614), the processing proceeds to step S615. If the frame display ON setting is not made (NO in step S614), the processing proceeds to step S617. In step S615, the system control unit 108 determines whether the processing in steps S606 and S613 is performed, or whether the desqueeze flag is ON. If the system control unit 108 determines that the desqueeze flag is ON (YES in step S615), the processing proceeds to step S617 without performing the processing of step S616. If the system control unit 108 determines that the desqueeze flag is OFF (NO in step S615), the processing proceeds to step S616.

In step S616, the system control unit 108 controls the external output 115 to reduce the display image data held in the RAM 111 so as to provide a band-like area. Specifically, in step S616, the processing of reducing the display image data is performed so that the image 902 is displayed. Step S616 is carried out regardless of whether the desqueeze display setting is ON or OFF. Accordingly, the image to be reduced includes the display image data 203 and 704 on which the desqueeze processing has been performed.

Figure 9B:
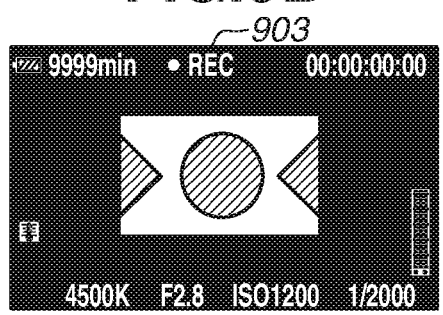

In step S615, if the system control unit 108 determines that the desqueeze flag is ON (YES in step S615), even when the frame display ON setting is made (frame display setting is ON), an image 903 illustrated in FIG. 9B is displayed without reduction of the display image data 401. In other words, when the desqueeze flag is ON, the image 903 is displayed regardless of whether the frame display setting is ON or OFF.

The image is prevented from being reduced even when the frame display ON setting is made, so that the display image data is not reduced more than necessary, thus securing the visibility.

In the case of shooting in which either the recording resolution or the shooting frame rate satisfies a predetermined condition, the system control unit 108 may determine that the desqueeze flag is ON (YES in step S615), and omits reduction of the image. In a case where the recording resolution is high, in generating the display image data from the YUV format image data 202, the amount of data corresponding to one line of the image data is large, and thus there is a possibility that writing of the display data cannot be completed in time. Accordingly, even when the frame rate is not a large value, the YUV format image data 202 is reduced (down-converted) in the longitudinal direction and in the lateral direction and the reduced image data is displayed. In other words, there is a possibility that down-convert processing is to be performed when the image resolution and the frame rate are not 4 K and 60 p, respectively, but are, for example, 8 K and 30 p. With a recording resolution of 8 K or higher, down-convert processing is to be performed to constantly display a live view image on time. At this time, even when the frame display ON setting is not made, the image for frame display is not reduced because a black band area is present around the image to be displayed.

Similarly, in a case where the frame rate is more than or equal to a predetermined frame rate, the time for generating display image data is short, and thus there is a possibility that writing of data corresponding to one line of the display image data cannot be completed in time even when the recording resolution is not high. Accordingly, in such a case, the YUV format image data 202 is reduced (down-converted) in the longitudinal direction and in the lateral direction and the reduced image data is displayed. In the case of displaying down-converted image data, an area for displaying information can be provided around the image. Accordingly, a black band area for displaying information can be provided regardless of whether the frame display setting is ON or OFF. Thus, even if the frame display ON setting is not made, the image is not reduced because the area for displaying information has been provided around the image to be displayed (in a state where the information and the image do not overlap). The area for displaying information according to the present embodiment described above is a black band area, but instead may be a white area or an area with a color other than white.

In step S617, the system control unit 108 controls the external output 115 such that OSD data (information) overlaps the display image data held in the RAM 111, the resultant image data is output to the outside of the video camera 100, and the output data is displayed on the display unit 115a.

Figure 9C:
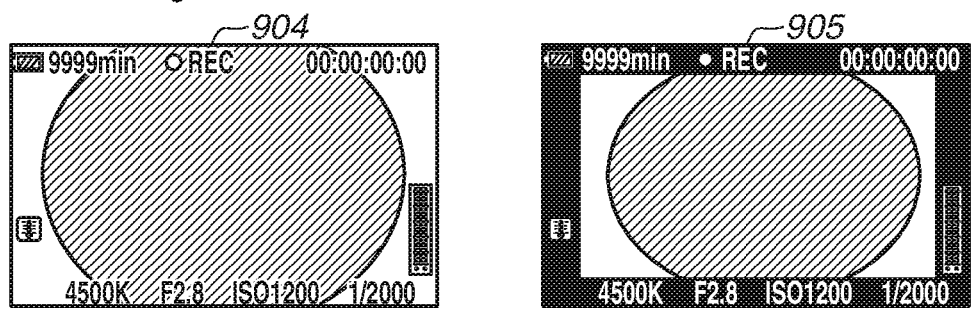
Figure 9D:
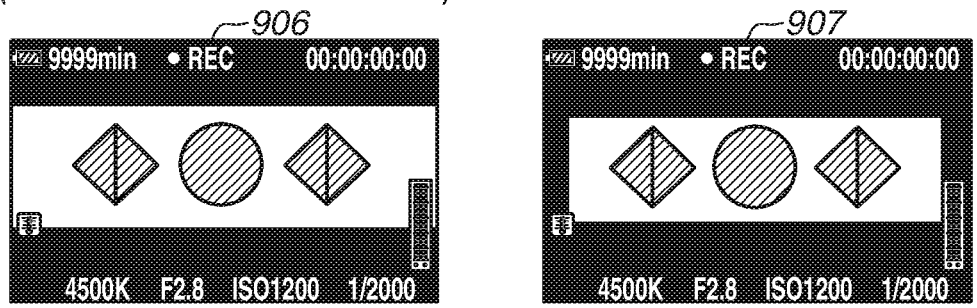

Next, display examples using a magnification function (Magn) will be described with reference to FIGS. 9C and 9D Images 904 and 905 illustrated in FIG. 9C illustrate display examples in a case where the desqueeze display ON setting is made and the magnification function for focus checking is executed.

If the magnification function according to the present embodiment is enabled, the image is displayed on the entire screen as illustrated in the image 904 illustrated in FIG. 9C even when the variable frame rate mode is set. Thus, if the frame display ON setting is made, the reduced image 905 is displayed.

In the present embodiment, side black processing is performed in step S613, but the side black processing may be omitted. In such a case, an image 906 illustrated in FIG. 9D is displayed. Although no image is displayed in areas on the upper side and lower side of the display unit 115a at this time, the areas on the left side and right side of the image partially overlap the information. Thus, in a case where the frame display ON setting is made, the image is displayed in a state where the image is reduced to a size smaller than the image 906 as indicated by an image 907. In a case where information is displayed only on the upper side and the lower side, there is no need to reduce the image. As described above in regard to the images 904 and 905, in a case where the OSD data and display image data overlap each other with the frame display setting ON, the display image data is further reduced to a size smaller than the display image data used when the frame display setting is OFF.

As described above, according to the present embodiment, even when a moving image with a variable frame rate is captured using an anamorphic lens, the image can be displayed in a state where the image is desqueezed during recording of the moving image. In a case where the variable frame rate mode is set and the frame display ON setting is made, the image to be displayed is not reduced. Thus, the frame display can be performed without degradation in the image visibility. By contrast, in normal shooting (variable frame rate mode is not set), an image is reduced to provide an area for displaying information. In the case of normal shooting, an image is displayed with a size that matches a screen size. Thus, even when the image is reduced to some extent, the image visibility is not significantly degraded. Consequently, both the image visibility and the visibility for display of information can be achieved. In the case of displaying information around an image, the degradation in image visibility can be prevented.

Various control operations that are described to be performed by the system control unit 108 may be performed by a single hardware device, or the overall operation of the display control apparatus may be shared by a plurality of hardware devices.

While the present disclosure has been described in detail above based on suitable embodiments, the present disclosure is not limited to the above-described specific embodiments. Various modes within the scope of the disclosure are also included in the present disclosure. Further, the above-described embodiments are merely illustrative of the embodiments of the present disclosure, and the embodiments can also be combined as appropriate.

While the embodiments described above illustrate an example where the present disclosure is applied to the video camera 100, the present disclosure is not limited to this example. Any display control apparatus can be applied as long as the display control apparatus can perform display control. Specifically, the present disclosure is applicable to a mobile phone terminal, a mobile image viewer, a printer apparatus including a finder, a digital photo frame, a music player, a game console, an electronic book reader, and the like.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The functions may include subroutines, modules, sub-programs, or units. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-152800, filed Aug. 23, 2019 which is hereby incorporated by reference herein in its entirety.

What is claimed is:
1. A display control apparatus comprising:
an acquisition unit configured to acquire a captured image;
a switching unit configured to switch between first shooting and second shooting different from the first shooting, the first shooting being shooting in which at least one of a condition that a recording resolution is greater than or equal to a predetermined resolution and a condition that a shooting frame rate is greater than or equal to a predetermined frame rate is satisfied; and
a control unit configured to perform control to display an image on a display unit in such a manner that, in the second shooting, the image to be displayed on the display unit is reduced to a smaller size in a case where a frame display setting is ON than in a case where the frame display setting is OFF, and, in the first shooting, the image to be displayed on the display unit in the case where the frame display setting is ON is not reduced to a size smaller than that of the image to be displayed on the display unit in the case where the frame display setting is OFF, the frame display setting being a display setting for information.

2. The display control apparatus according to claim 1, wherein, in the first shooting, the control unit performs control so that a size of the image to be displayed on the display unit is not changed between when the frame display setting is ON and when the frame display setting is OFF.

3. The display control apparatus according to claim 1, wherein, in the case where the frame display setting is ON, the control unit performs control so that information is displayed around the image to be displayed on the display unit such that the information does not overlap the image.

4. The display control apparatus according to claim 1, wherein the first shooting is shooting in a shooting mode in which the shooting frame rate is changeable by a user.

5. The display control apparatus according to claim 1, wherein first image data is image data obtained through an anamorphic lens, and the image data obtained through the anamorphic lens is image data corresponding to an image of an object which is formed in a state where the image of the object in a horizontal direction is more compressed than that in a vertical direction.

6. The display control apparatus according to claim 1, wherein the acquisition unit is configured to acquire first image data corresponding to an image of an object which is formed with different magnifications between a horizontal direction and a vertical direction, and
wherein the control unit performs control so that first resize processing is performed on the first image data in the second shooting, and second resize processing is performed on the first image data in the first shooting.

7. The display control apparatus according to claim 6, wherein, in the first resize processing, first processing for clipping a part of the first image data is performed and then resize processing for generating a display image is performed such that second image data having been subjected to the first processing has a predetermined aspect ratio.

8. The display control apparatus according to claim 6, wherein the control unit performs the first resize processing on the first image data in which the image of the object in the horizontal direction is more compressed than that in the vertical direction, in such a manner that a magnification for resizing in the horizontal direction is made larger than a magnification for resizing in the vertical direction.

9. The display control apparatus according to claim 7, wherein, in the first processing, the control unit clips a portion including a central area of the first image data by clipping a part of the first image data in the horizontal direction.

10. The display control apparatus according to claim 6, wherein, in the second resize processing, a display image is generated by performing resize processing on the first image data, with first processing for clipping a part of the first image data not being performed.

11. The display control apparatus according to claim 6, wherein a display image resized in the second resize processing is displayed with a predetermined aspect ratio by a band area being displayed on the display image.

12. The display control apparatus according to claim 6, wherein, in the second resize processing, the control unit performs control to compress the first image data in the vertical direction, without compressing the first image data in the horizontal direction.

13. A method for controlling a display control apparatus comprising:
acquiring a captured image;
switching between first shooting and second shooting different from the first shooting, the first shooting being shooting in which at least one of a condition that a recording resolution is greater than or equal to a predetermined resolution and a condition that a shooting frame rate is greater than or equal to a predetermined frame rate is satisfied; and
performing control to display an image on a display unit in such a manner that, in the second shooting, the image to be displayed on the display unit is reduced to a smaller size in a case where a frame display setting is ON than in a case where the frame display setting is OFF, and, in the first shooting, the image to be displayed on the display unit in the case where the frame display setting is ON is not reduced to a size smaller than that of the image to be displayed on the display unit in the case where the frame display setting is OFF, the frame display setting being a display setting for information.

14. A non-transitory computer-readable storage medium storing a program for causing a computer to function as an acquisition unit, a switching unit and a control unit of a display control apparatus,
wherein the acquisition unit is configured to acquire a captured image,
the switching unit is configured to switch between first shooting and second shooting different from the first shooting, the first shooting being shooting in which at least one of a condition that a recording resolution is greater than or equal to a predetermined resolution and a condition that a shooting frame rate is greater than or equal to a predetermined frame rate is satisfied, and
the control unit is configured to perform control to display an image on a display unit in such a manner that, in the second shooting, the image to be displayed on the display unit is reduced to a smaller size in a case where a frame display setting is ON than in a case where the frame display setting is OFF, and, in the first shooting, the image to be displayed on the display unit in the case where the frame display setting is ON is not reduced to a size smaller than that of the image to be displayed on the display unit in the case where the frame display setting is OFF, the frame display setting being a display setting for information.

* * * * *